United States Patent [19]

Encellaz et al.

[11] 3,876,949

[45] Apr. 8, 1975

[54] PHASE-SHIFT CELL AND A PHASE SHIFTER FOR THE APPLICATION OF SAID CELL

[75] Inventors: Robert Encellaz, Saint Martin-d'Heres; Jean-Paul Bonnefoy-Claudet, Montrouge; Hans Jedlitschka, Chatillon-sous-Bagneux; Michel Martin, Brie Angonnes; Edmond Tournier, Grenoble, all of France

[73] Assignees: Commissariat A l'Energie Atomique, Paris; Tekelec-Airtronic, Sevres, both of, France

[22] Filed: Sept. 28, 1972

[21] Appl. No.: 292,933

[30] Foreign Application Priority Data

Oct. 5, 1971 France .............................. 71.35774

[52] U.S. Cl. .................. 328/127; 328/155; 328/128

[51] Int. Cl. .......................................... H03k 17/00

[58] Field of Search ...... 328/127, 155, 28; 307/262; 331/45; 323/101, 106; 331/45

[56] References Cited

UNITED STATES PATENTS 2,567,410 9/1951 Trousdale ............................ 331/45

3,502,976 3/1970 Chamberlin .................... 328/155 X

*Primary Examiner*—Michael J. Lynch
*Assistant Examiner*—B. P. Davis
*Attorney, Agent, or Firm*—Flynn & Frishauf

[57] ABSTRACT

The phase-shift cell comprises in combination a programmable generator which produces constant currents, a bistable threshold circuit connected through an integrator to the output of the generator, and a feedback loop connected between the output of the threshold circuit and the input of the generator. Reversals of the threshold circuit to a first state are initiated by synchronizing signals to be phase-shifted, reversals to a second state being initiated by the output signal of the integrator when the signal attains the threshold level of the bistable circuit. The phase shift of the output signal of said bistable circuit with respect to the input signal is determined by the instant $T_1$ of reversal to the second state. An additional current generator connected between the aforementioned generator and the integrator modifies the output signal of this latter in order to vary the instant of reversal of the bistable threshold circuit to the second state.

2 Claims, 9 Drawing Figures

PHASE-SHIFT CELL AND A PHASE SHIFTER FOR THE APPLICATION OF SAID CELL

This invention relates to phase shifters.

Devices of this type which are already known usually consist of filter networks. In these devices, the phase is dependent on the frequency.

Other devices for comparing saw-tooth waveforms with threshold levels can be made aperiodic by means of complicated expedients but cannot operate over a broad dynamic frequency range. These devices are also dependent on accuracy and drift of the thresholds.

Still further devices of the digital type can also be aperiodic but cannot operate over a wide frequency range. Moreover, the phase variation can take place only in a discrete manner.

The aim of the invention is to overcome the above-mentioned disadvantages by producing a phase-shift cell which is of simple construction and exhibits good reliability of operation. The invention is therefore directed to a phase-shift cell of this type which essentially comprises in combination a programmable generator which produces constant currents, a bistable threshold circuit connected through an integrator to the output of said generator, a feedback loop being connected between the output of said threshold circuit and the input of said programmable generator, the reversals of said threshold circuit to a first state being initiated by synchronizing signals to be phase-shifted whilst the reversals of said threshold circuit to a second state are initiated by the output signal of the integrator when said signal attains the threshold level of said bistable circuit, the phase shift of the output signal of said circuit with respect to the input signal being determined by the instant $T_1$ of reversal of said bistable circuit to the second state thereof. In accordance with one particular feature of the invention, an additional current generator connected between said generator and the integrator is intended to modify the output signal of said integrator in order to produce a variation in the instant of reversal of the bistable threshold circuit to said second state.

The invention is also directed to a signal phase shifter which essentially comprises four cascade-connected phase-shift cells as hereinabove defined, the first of said cells being provided with an additional current generator in such manner as to deliver a signal which is displaced in phase with respect to the input signal having a period T by a quantity $\theta$ such that $j \leqslant \theta \leqslant T/2 - j$ and being synchronized by said input signal whilst the three other cells are respectively synchronized in each case by the output signals of the bistable threshold circuit of the preceding cell, said signals being displaced in phase with respect to the input signal respectively by $T/4 + \theta$, $T/2 + \theta$ and $3T/2 + \theta$, the outputs of the first and the third cell and the outputs of the second and the fourth cell being connected respectively to the inputs of two bistable circuits, the ranges of phase displacement at the outputs of said bistable circuits being respectively $90° \pm 90\ (T - 4j/T)$; etc.. $360 \pm 90°\ (T - 4j/T)$.

Further characteristic features and advantages of the invention will become apparent from the description which now follows below, reference being made to the accompanying drawings which are given solely by way of example, and in which.

Figure 1:
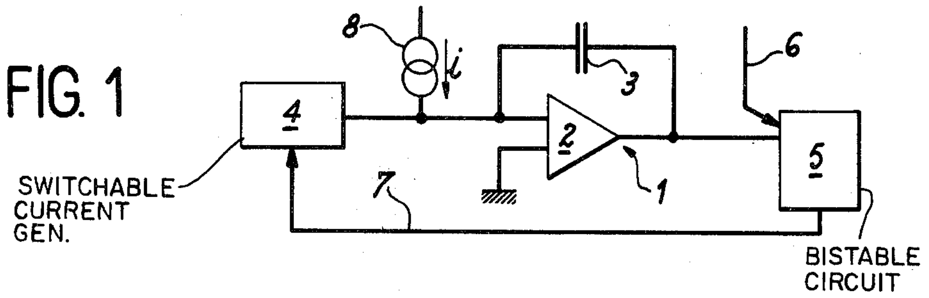
FIG. 1 is a schematic diagram of the cell according to the invention for shifting signals in phase.

The phase-shift cell or phase-shifting element which is illustrated in FIG. 1 mainly comprises an integrator 1 formed by an operational amplifier 2, a capacitor 3 being connected between one input and the output of said amplifier.

The input of the amplifier 2 is connected to the output of a first programmable current generator 4 which is capable of delivering in alternate sequence two currents $I_1$ and $I_2$ having different and constant intensities.

The output of the integrator 1 is connected to the input of a bistable threshold circuit 5 having another input 6 to which synchronizing signals are applied.

The bistable circuit 5 of the type which operates in accordance with the Eccles-Jordan principle, for example, is connected to one control input of the generator 4 through a feedback loop 7 in order to determine the choice of current delivered by this latter.

Finally, a second current generator 8 is connected between the first generator 4 and the integrator 1.

In order to illustrate the operation of the circuit of FIG. 1, reference will be made to the diagram of FIG. 2 in which the curves (*a*), (*b*), (*c*) and (*d*) represent respectively the synchronizing signals applied to the bistable circuit 5, the threshold level of the bistable circuit, the output signal of the integrator 1, and the output signal of the bistable circuit.

Figure 2:
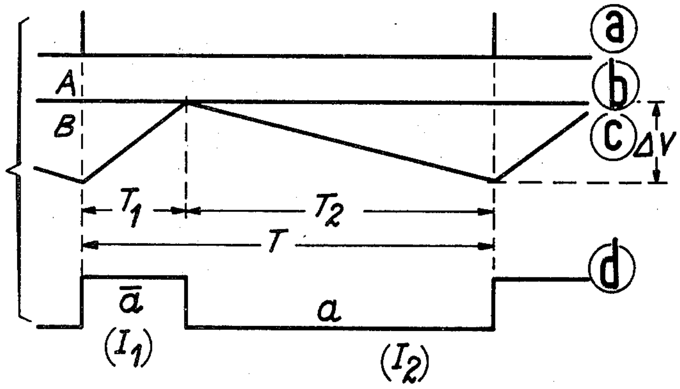
FIG. 2 is a time-dependence diagram of the signals collected at different points of the diagram of FIG. 1.

Referring first to the threshold level which is represented by the straight line (*b*) of FIG. 2, this straight line defines two zones A and B of the dynamic range of output of the integrator.

When the output voltage of the integrator reaches the zone A from the zone B, the bistable circuit assumes a state "$\bar{a}$" which initates operation of the generator 4 so that this latter should deliver at its output the current $I_2$, the direction of which is such as to return the output of the integrator 1 into the zone B.

The bistable circuit 5 remains in state "$\bar{a}$" until a synchronizing signal (*a*) applied to its input 6 causes the bistable circuit to change-over to a state "*a*" which initiates the operation of the generator 4 in order that there should thus appear at its output the current $I_1$ having a sign such as to return the output of the integrator 1 from the zone B to the zone A.

When the output voltage of the integrator 1 attains the threshold ($b$), the initial conditions are again restored.

The arrangement of FIG. 1 therefore behaves as a circuit for shaping synchronizing signals if these latter are periodic.

The time intervals $T_1$ and $T_2$ which correspond to the states "$a$" and "$\overline{a}$" of the bistable threshold circuit depend on the currents $I_1$ and $I_2$ which are delivered by the generator 4 as shown by the following calculation.

The currents $I_1$ and $I_2$ being considered as circuit parameters, let $$I_1 = KI$$

$$I_2 = -I$$

with $K > 1$.

If the current generator 8 applies a continuous current $i$ to the input of the integrator with $|i| < I$, the time configuration of the states of the bistable circuit 5 are linearly dependent on $i$.

When $i$ is close to the value of I, the input of the integrator 1 is not driven far into zone B, which means that the approach to the threshold ($b$) of FIG. 2 following the next switching of the bistable circuit 5 in consequence of a signal applied to its input 6 starts from a voltage close to the threshold. This explains why the switching back of the bistable circuit 5 when the threshold is reached, the time of which determines the intervals $T_1$ and $T_2$, depends not only on the current $I_1$, which as discussed above is equal to $KI + i$, but also on the current $I_2$, which in the example given is equal to $-I + i$.

Let $T$ be the period of the output signal of the bistable circuit 5 as defined by two successive synchronizing signals applied to the input 6 of said circuit and let $T_1$ and $T_2$ be the time intervals of the states $a$ and $\overline{a}$ assumed by the bistable circuit during the period $T$.

We then have $T = T_1 + T_2$.

Let $\Delta V$ be the variation in output voltage of the integrator 1 as shown at ($c$) in FIG. 2, neglecting $i$ for the moment.

$\Delta V$ can be expressed as a function of $I_1, T_1$ or $I_2$, $T_2$ by the relation:

$$\Delta V = I_1 T_1 = -I_2 T_2$$

so we get $$\frac{T_1}{I_2} = -\frac{T_2}{I_1}$$

At the input of the integrator, there takes place an algebraic addition of the currents $I_1$ or $I_2$ of the generator 4 to the current $i$ of the generator 8, whith the result that the currents applied to the amplifier 2 are given by the relations:

$$I'_1 = KI + i$$

$$I'_2 = -I + i$$

which gives the relation:

$$\frac{T_1}{-I+i} = \frac{T_2}{-KI-i} = \frac{-(T_1+T_2)}{(1+K)I} = \frac{-T}{(1+K)I}$$

and $T_1 = T\dfrac{I-i}{(1+K)I}$

Postulating that the current $i$ delivered by the generator 8 is zero, $i = o$, the time interval $$T_{10} = \frac{T}{1+K}$$

and by setting $\Delta T = T_1 - T_{10}$, we obtain $$\Delta T = -T\frac{i}{I}\,\frac{1}{1+K} \qquad (1)$$

It has been found that, for reasons of stability, the operation of a circuit of this type is possible only if $T_1 < T_2$, which is equivalent to $I_1 > I_2$.

Under these conditions, if the time interval $T_1$ is given a value either lower than or equal to one-half of the period T of the output signal of the bistable circuit 5, $T_1 \leqslant T/2$, the center of the range or utilization of the circuit is defined by $T_{10} = T/4$, which corresponds in accordance with the equation:

$$\frac{T}{4} = \frac{T}{1+K} \text{ to } K = K_o = 3$$

and limits the value of the current $i$ to $|i| < I$.

It is found that the value and the stability of the threshold do not have any effect on the operation of the circuit, with the result that this operation is not influenced by any possible drift of said threshold.

If we now employ expression (1) once again $$\Delta T = -T \cdot \frac{i}{I} \cdot \frac{1}{1+K}$$

it is deduced therefrom that:

$$\frac{\Delta T}{T} = -\frac{i}{I} \cdot \frac{1}{1+K}$$

In accordance with the previous relation, the quantity $\Delta T/T$ is a number which is independent of the period and can be considered as a phase angle.

$$\frac{\Delta T}{T} = \frac{\Delta\alpha}{360} = -\frac{i}{I} \cdot \frac{1}{1+K}$$

in which the angle $\alpha$ can be governed by the intensity of the current $i$ delivered by the generator 8.

Taking as an example the conditions in which $K_o = 3$, we obtain:

$$\Delta\alpha = -\frac{i}{I} \cdot \frac{1}{4} \cdot 360$$

$$\Delta\alpha = -90 \cdot \frac{i}{I}$$

with $$|i| < I.$$

In accordance with equation (1), if the current delivered by the generator 8 is zero ($i = o$), $\Delta T = 0$, consequently $T_1 = T_{10}$, and as in the case of $K_a = 3$, $$T_{10} = \frac{T}{4} \qquad \frac{T_{10}}{T} = \frac{1}{4}, \alpha_o = 90°.$$

In consequence, when the current $i = 0$, the circuit arrangement constitutes an elemental 90° phase shifter;

When $i \neq 0$ but $|i| < I$, the circuit constitutes an elemental phase shifter which produces a displacement in phase of $90° + \Delta\alpha$ with $|\Delta\alpha| < 90°$.

Figure 3:
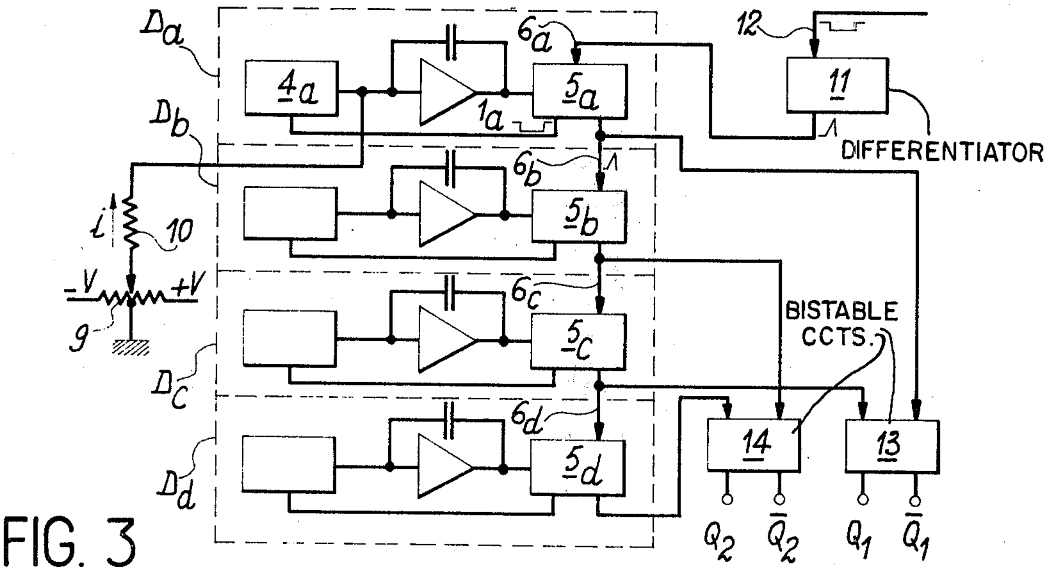
FIG. 3 is a schematic diagram of an aperiodic phase shifter, a number of cells such as the cell shown in FIG. 1 being employed in the construction of said phase shifter.

These possibilities of the circuit arrangement illustrated in FIG. 1 are turned to useful account in the design of the aperiodic phase shifter which is illustrated in FIG. 3. This phase shifter is made up of four phase-shifting elements D*a* to D*d* such as the element shown in FIG. 1.

A current generator 8*a* formed by a voltage divider 9 is connected between the integrator 1*a* and the current generator 4*a* of the phase-shifting element D*a*. Said voltage divider is so arranged that the opposite terminals are connected to voltage sources +V and −V and the slider is connected to the conductor which connects the generator 4*a* to the integrator 1*a* through a resistor 10.

A differentiator connected to the input 6*a* of the bistable threshold circuit 5*a* and having an input 12 to which the signal to be phase-shifted is applied has the design function of differentiating the positive fronts of said signal in order to ensure synchronization of the circuit. The phase-shifting element D*a* is therefore of the type which produces a phase shift of $90° + \Delta\alpha$.

The phase-shifting elements D*b*, D*c* and D*d* are of the type which produce a 90° phase shift and therefore do not comprise a current generator *i*.

The bistable circuit 5*a* is connected to the synchronization input 6*b* of the bistable circuit 5*b* of the phase-shifting element D*b* by means of a differentiator (not illustrated). Similarly, the bistable circuits 5*b* and 5*c* are connected respectively at their corresponding outputs to the synchronization inputs 6*c* and 6*d* through differentiators (not shown).

The phase shifter further comprises two bistable circuits 13 and 14, the inputs of the bistable circuit 14 being connected respectively to the outputs of the differentiators (not shown) whilst the inputs of the bistable circuit 14 are connected respectively to the outputs of the differentiating circuits (not shown).

Figure 4:
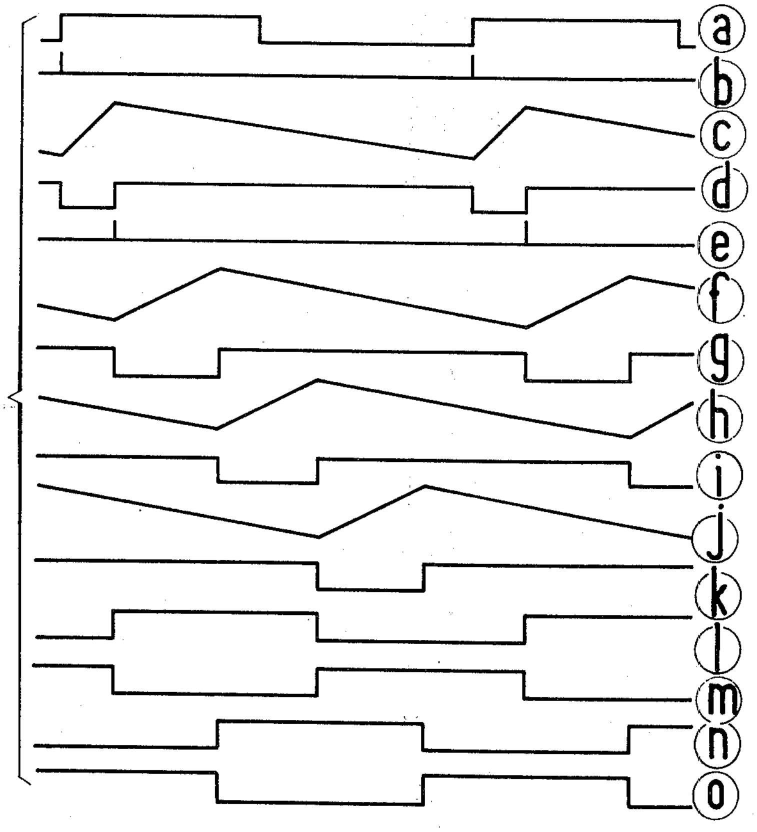
FIG. 4 is a time-dependence diagram of signals sampled at different points of the phase shifter of FIG. 3.

The operation of the phase shifter is illustrated by means of the diagram of FIG. 4, in which the curves (*a*) to (*o*) represent the signals at different points of interest of the circuit.

The phase-shifting element D*a* is synchronized by the positive fronts (curve (*b*)) of the signal to be phase-shifted (curve (*a*) of FIG. 4).

Said element delivers a positive pulse which is delayed with respect to the input signal by a quantity $\theta$ which is theoretically comprised between 0 and $T/2$.

However, for reasons of stability, a limited operating range is employed, in which case the value $\theta$ is such that $$j \leq \theta \leq \frac{T}{2} - j.$$

The output signal of the bistable threshold circuit 5*a* of the phase-shifting element D*a* is represented by the curve (*d*) of FIG. 4.

Said signal is differentiated in a differentiating circuit which has not been illustrated (curve (*e*)) and applied to the synchronization input of the bistable threshold circuit 5*b* of the phase-shifting element D*b* which delays said signal by $T/4$ with respect to the synchronizing signal (curve (*g*)), that is to say by $T/4 + \theta$ with respect to the input signal.

Said signal is then shifted in phase by $T/4$ with respect to the synchronizing signal by means of the phase-shifting element Dc (curve (*i*)), that is to say by $T/2 + \theta$ with respect to the input signal.

The phase-shifting element Dd which is controlled by the signal delivered by the phase-shifting element Dc produces a signal which is delayed by $T/4$ with respect to its synchronizing signal, namely $3T/2 + \theta$ with respect to the input signal.

After each phase shift, the signal is collected at the output of differentiators (not shown) and applied to a corresponding input of the two bistable circuits 13 and 14 which deliver at their outputs the signals shown at (*l*) to (*o*) in FIG. 4.

The output $Q_1$ of the bistable circuit 13 delivers a square-wave signal (shown at (*l*) in FIG. 4), the phase shift $\phi$ of which with respect to the input signal varies with the current i delivered by the generator 9, 10 within limits such that:

$$\frac{360\,j}{T} \leq \phi \leq 180 - \frac{360\,j}{T}$$

The output $\overline{Q}_1$ of the bistable circuit 13, as shown at (*m*) in FIG. 4, is in opposite phase with respect to the output $Q_1$. Said output is therefore phase-shifted with respect to the input signal by an angle $\phi$ such that $$180 + \frac{360\,j}{T} \leq \phi \leq 360 - \frac{360\,j}{T}$$

Similarly, the output $Q_2$ of the bistable circuit 14 delivers a signal which is shown at (*n*) in FIG. 4 and in which the phase shift $\phi$ with respect to the input signal also varies with *i* within the limits defined by the inequality $$90° + \frac{360\,j}{T} \leq \phi \leq 270 - \frac{360\,j}{T}$$

whilst the output $\overline{Q}_2$ as shown at (*o*) in FIG. 4 is phase-shifted with respect to the input signal by an angle $\phi$ such that:

$$270° + \frac{360\,j}{T} \leq \phi \leq 90 - \frac{360\,j}{T}$$

In order to guarantee good stability of operation, the current $i$ delivered to the phase-shifting element D$a$ by the generator 9,10 is subjected to a deviation such as to permit variations in phase of ± 50°; in this case, we have:

$$\frac{360\,j}{T} = 90° - 50°$$

that is to say $$\frac{360\,j}{T} = 40°$$

There are then obtained in the case of the outputs $Q_1$, $Q_2$, $\overline{Q}_1$, $\overline{Q}_2$ of the bistable circuits 13 and 14 ranges of variation in phase of ± 50° which are centered on 90°, 180°, 270° and 360°.

A suitable choice of any one of the outputs $Q_1$, $Q_2$, $\overline{Q}_1$ and $\overline{Q}_2$ and of the current $i$ therefore makes it possible to obtain at one of the outputs of the phase shifter a square-wave signal which is displaced in phase with respect to the input signal by any quantity between 0° and 360°.

Figure 5:
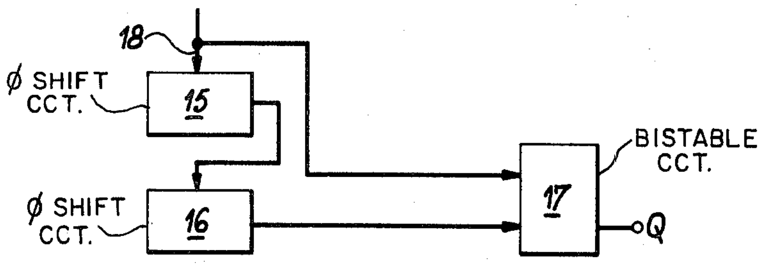
FIG. 5 is a schematic diagram of a controlled duty-cycle signal generator which makes use of circuits such as the circuit shown in FIG. 1.

The circuit which is illustrated in FIG. 1 is also employed in the construction of the controlled duty-cycle signal generator which is shown in FIG. 5.

Said generator comprises two cascaded elemental phase-shifter circuits 15, 16 providing fixed phase displacement and a bistable circuit 17, the two inputs of which are connected respectively to the synchronization input 18 of the circuit 15 and to the output of the bistable threshold circuit (not shown) of the circuit 16.

A generator of this type makes it possible to obtain from pulsed signals a square-wave signal having a duty cycle of one-half.

Figure 6:
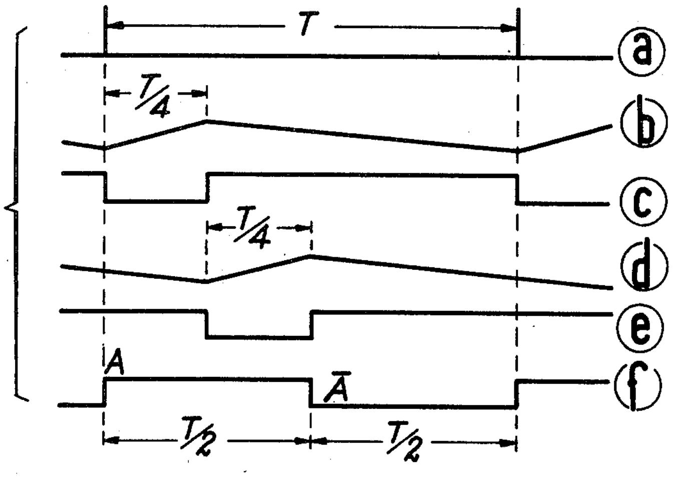
FIG. 6 is a time-dependence diagram showing the signals sampled at different points of the circuit of FIG. 5.

A pulsed signal applied to the input 18 of the circuit 15 synchronizes said circuit and initiates the reversal of the bistable circuit 17 to a first state A as shown at ($a$) and ($f$) in FIG. 6.

The output signal ($c$) of the circuit 15, as delayed by $T/4$ with respect to the input signal, is suitably differentiated and the resultant pulses corresponding to the positive fronts of said output signal are applied to the synchronization input of the circuit 16 and this latter then delivers at its output a signal ($e$) which is delayed by $T/2$ with respect to the input signal of the circuit 15.

The output signals of the circuit 16 initiate the reversal of the bistable circuit 17 to a state $\overline{A}$.

As a result, the transition of the bistable circuit 17 from state A to state $\overline{A}$ takes place only at the end of a time interval $T/2$ after application of the input signal.

There therefore appears at the output of the bistable circuit a signal ($f$) having the same period as the input signal and a duty cycle of one-half.

If so desired, it is of course possible to obtain at the output of the bistable circuit 17 a signal having any duty cycle between 0 and 1.

To this end, the elemental phase-shifters 15 and 16 in the circuit of FIG. 5 need only be replaced by the phase shifter of FIG. 3, in which case the reversal of state of the bistable circuit 17 is initiated on the one hand by the input signal of the phase shifter and on the other hand by one of the outputs $Q_1$ to $\overline{Q}_2$ of this latter.

Figure 7:
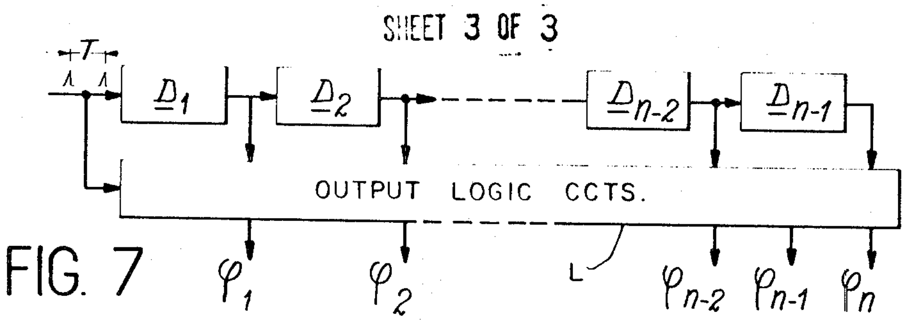
FIG. 7 is a schematic diagram showing the application of the circuit of FIG. 1 to an aperiodic polyphase generator.

The aperiodic polyphase generator which is shown in FIG. 7 makes it possible to divide a period $T$ into two parts, namely $T/K$ in one case and $T$ ($K - 1/K$) in the other case.

A generator having n phases makes it possible to split up a complete period into n different states.

The generator must therefore be so designed as to split up the period $T$ into $n$ portions each having a value of $T/n$.

With this objective, there are employed ($n - 1$) circuit elements $D_1$ to D$n - 1$ which are of the type shown in FIG. 1 and connected in a chain.

Each phase-shifting element is also connected to a phase-synthesizing logic circuit L.

Each phase-shifting element $D_1$ to D$n - 1$ delivers a signal corresponding to the beginning of the following phase.

The logic circuit L which is synchronized, if desired for reliability, by the input signal then reconstitutes each of the $n$ signals thus obtained as was done, for example, for the four outputs of the respective cells of the circuit of FIG. 3 by the bistable flipflop circuits 13 and 14, and delivers at its n outputs signals having a period T but relatively displaced by $T/n$. *Since the* $n$th input is simply the input signal delayed for the complete period T, an $n$th phase shifting circuit is not necessary and if a separate nth input is necessary, a known circuit for delivering the input signal following the input signal which is delivered at the first of the $n$ outputs can be used.

Figure 8:
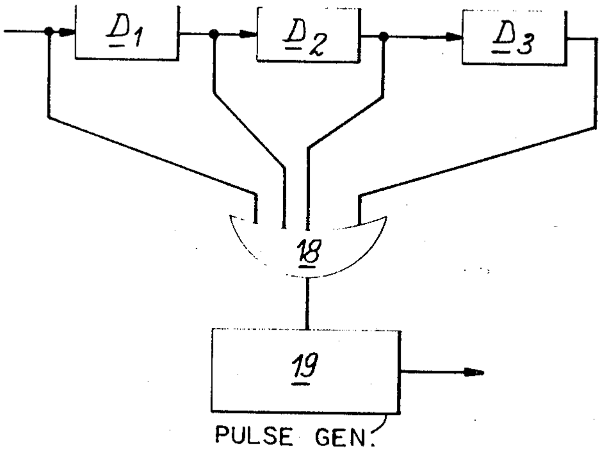
FIG. 8 is a schematic diagram showing the application of the circuit of FIG. 1 to an aperiodic frequency multiplier.

The aperiodic frequency multiplier which is shown by way of example in FIG. 8 performs multiplication by 4.

Said multiplier comprises three chain-connected phase-shifting elements $D_1$ to $D_3$ having fixed phase displacement and of the same type as the element shown in FIG. 1.

The phase-shifting element $D_1$ is synchronized by the input signal having a period $T$, the frequency of which is to be multiplied. The multiplier further comprises an OR-circuit 18, the inputs of which are connected to the inputs and to the outputs of the three phase-shifters $D_1$ to $D_3$.

The output of the OR-gate is connected to a generator 19 having a duty cycle of one-half such as, for example, the generator which is shown in FIG. 5.

Figure 9:
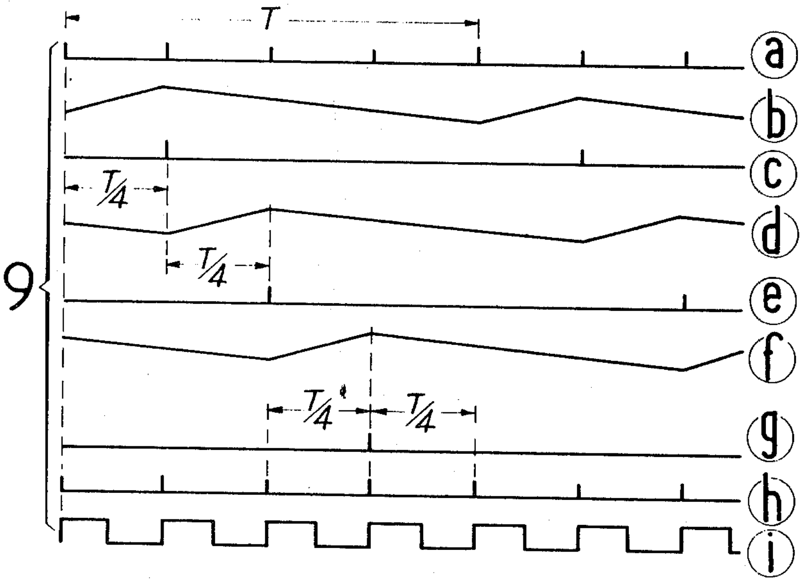
FIG. 9 is a time-dependence diagram showing the formation of the output signal of the multiplier of FIG. 8.

Each phase-shifting element $D_1$ to $D_3$ delivers a synchronizing pulse ($c$), ($e$), ($g$), (shown in FIG. 9) which is delayed with respect to the input signal ($a$) by $T/4$, $T/2$ and $3T/4$.

The OR-circuit 18 re-groups these pulses and the input pulse and delivers four uniformly spaced pulses ($h$) during one period $T$. These pulses are applied to the ½ duty cycle generator 19 which delivers at its output a square-wave signal ($i$) having a period $T/4$.

The devices shown in FIGS. 3, 5, 7 and 8 can operate over a very wide frequency band of the order of 1 cps to $10^6$ cps by mounting a network of self-switching capacitors across the terminals of the integrators which are employed in the construction of the phase-shifting elements.

What is claimed is:

1. An aperiodic generator of polyphase pulse signals having $n$–1 phases comprising:

$n$–1 chain-connected phase-shift cells of which the first cell is synchronized by a single phase input pulse signal of minimum repetition period $T$ to be converted to a polyphase pulse signal and the following cells are each synchronized by the output signal of the preceding cells;

a phase-synthesizing logic circuit having $n$ outputs and having connections to the outputs of each of said phase shift cells and arranged to produce $n-1$ outputs having the same repetition period as the input signal;

each of said phase shift cells comprising:

a constant current generator having two constant current output states, the direction of output current in one of said states being opposite to that in the other of said states;

an integrator having as its input the output of said constant current generator;

a bistable threshold circuit arranged to go from a first state to a second state when the output of said integrator attains a predetermined threshold level of said bistable threshold circuit and to go from its second state to its first state in response to input impulses, said bistable circuit being connected to switch said generator correspondingly between its output states; and means for deriving phase shifted output synchronizing signals from the transitions of said bistable threshold circuit from said first state to said second state; and means for supplying to at least one of said cells a current additional to the output of the constant current generator thereof for controlling the amount of phase shift produced thereby;

said phase shift cells being arranged so that the aggregate phase shift produced by the last of said phase shift cells for the maximum phase shift setting of said phase shift controlling means is less than said period $T$, so that the incremental phase shifts produced by the respective cells correspond to a polyphase distribution within the period $T$.

2. An aperiodic generator of polyphase signals as defined in claim 1 in which said period $T$ is a substantially constant repetition period of said single phase input signal, in which the increments phase shift produced by the respective phase shift cells are equal, and in which said phase shift controlling means supplies an additional current only to said first cell.

* * * * *